M. POND.
Cooking Range.
No. 102.
Reissued Aug. 21. 1847.
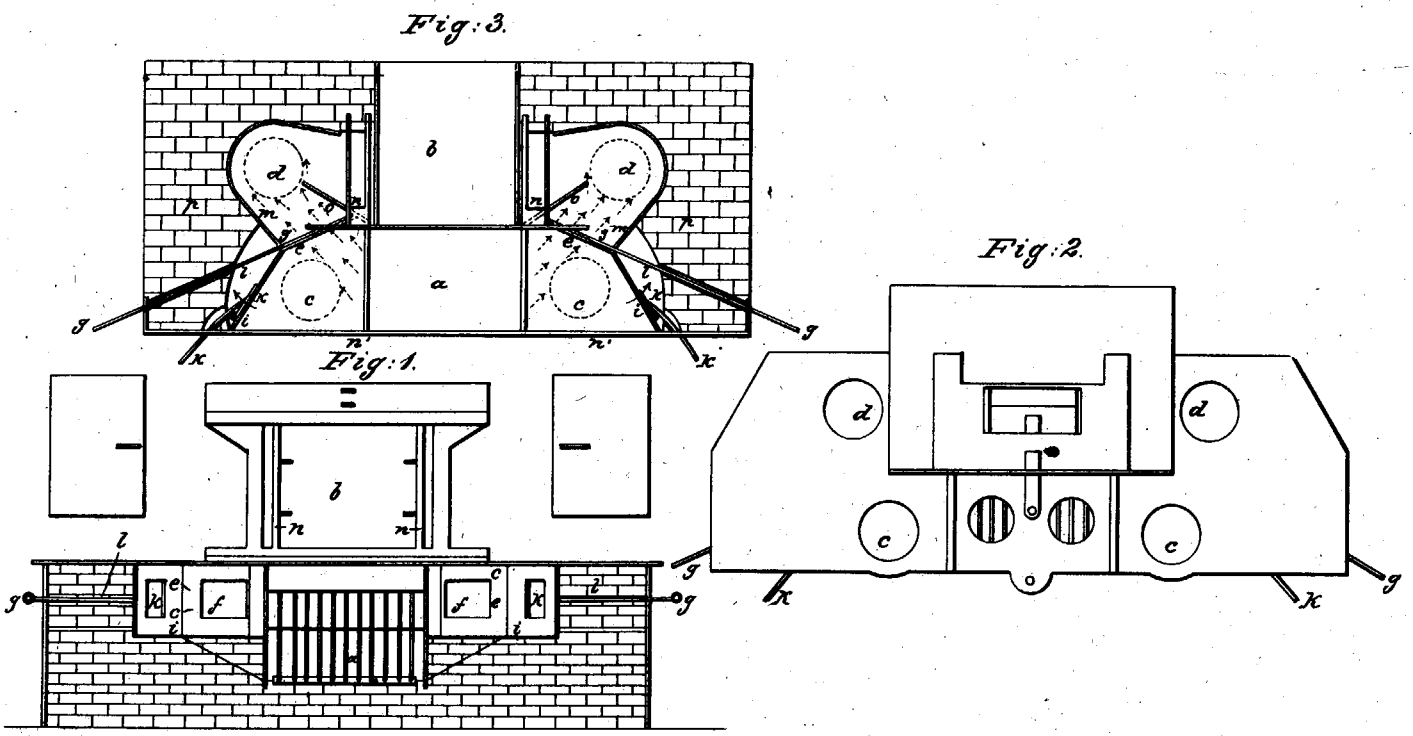
N. PETERS. Photo-Lithographer, Washington, D. C.

UNITED STATES PATENT OFFICE.

MOSES POND, OF BOSTON, MASSACHUSETTS.

IMPROVEMENT IN COOKING-RANGES.

Specification forming part of Letters Patent No. 4,830, dated October 29, 1846; Reissue No. 102, dated August 21, 1847.

*To all whom it may concern:*

Be it known that I, MOSES POND, of Boston, in the county of Suffolk and State of Massachusetts, have invented a new and useful Improvement in the Cooking-Range; and I do hereby declare that the following is a full and exact description of the same, reference being had to the accompanying drawings, which make part of my specification, and of which—

Figure 1 denotes an elevation of the range, the front plate or plates being supposed to be removed, so as to exhibit the internal arrangement of the fire-place and various other parts; Fig. 2, a top view, and Fig. 3 a plan exhibiting the appearance of things when all the top plates are removed.

As cooking-ranges heretofore have been constructed it has, so far as I have been able to learn, been deemed impracticable to have more than two boiling-chambers, so situated that one should be on each side of the fire-chamber or place for combustion of the fuel, two lateral flues being so arranged as to pass around the boilers and communicate with the flue space or spaces immediately about or around the oven.

As it is very desirable to increase the capacity of a range by the addition of other boilers or vessels in which water may not only be warmed, but, when desirable, raised to a boiling temperature, I have made an improvement by which I effectually attain this important end, the said improvement consisting in the addition and peculiar arrangement of two boiling-chambers on the back or rear, respectively, of the boiling-chambers hereinbefore employed, the said additional boiling-chambers being so disposed that the heat radiated directly from the fuel in combustion may be made to pass through the front boiling-chambers and impinge directly against the boiling-vessels of the rear or additional chambers. The adjacent front and rear boiling-chambers on each side of the fire-place are separated by partitions, which have flue-openings within them, and dampers applied to said openings so as to close them, either partially or wholly, as occasion may require, and so as to enable a person to cause the heat radiated from the fire to pass in contact with one or both of said boilers on each side of the said fire-place, as may be desirable.

Experience has taught me the extreme difficulty of raising the contents of any vessel to a boiling temperature by exposing the exterior of said vessel to be heated by the smoke or volatile products of combustion alone. In other words, I have found it extremely difficult to elevate the temperature to a boiling-point without either the flame from the fire being made to act upon it or the vessel be so arranged with respect to the fire as to admit heat and light to be directly radiated upon it. The radiated heat from a fire is effectual, while the heat drawn from smoke is very ineffectual in elevating a vessel of liquid to a boiling temperature. I have thus premised in order that what I conceive to be a very important improvement or incident to my invention may be clearly understood, the said improvement consisting in so arranging the two boiling-chambers on each side of the fire-place that the boiler of the rear or additional one of each set may be made to receive heat radiated directly from the fire-place, without being first made to course around the front boiler.

In the accompanying drawings, *a* represents the fire-chamber, and *b* the oven. The two boiling-chambers *c c*—one on each side of the fire-chamber—are such as have been heretofore employed.

*d d* are the additional or supplementary boiling-chambers, separated, respectively, from those first mentioned—viz., *c c*—by vertical partition-plates *e e*, having flue-holes *f f*, respectively, provided with dampers *g g*. The partition-plates *e e* are connected with the front plate, *h*, of the range by vertical plates *i i*, which latter, in connection with the former, aid in completing the boiling-chambers *c c*. The said plates *i i* are each provided with a flue-hole made through it, which has a regulating-damper, *k*, which is made so as to open or close the communication with outer flues, *l l*, formed between the plates *i i* and the masonry, and made to open, respectively, into the back or supplementary boiling-chambers.

Whenever it is desired to concentrate all the heat possible on the boilers of the front boiling-chambers, the dampers *g g* should be closed and the dampers *k k* opened; but if it is required throw most or a great part of the radiated heat on the boilers of the supplementary chambers, the dampers *k k* should be closed and the dampers *g g* opened. The flue-openings of said dampers *g g* and the boiling-vessels in both the front and additional boiling-chambers should be so arranged (as seen in Fig. 3, the position of the boilers being therein represented by dotted circles) as to enable the whole or a great part of the radiated heat of the sides of the fire to impinge directly upon the rear boilers when the dampers *k k* are closed and the dampers *g g* opened. After passing in contact with the back boilers and through the back boiling-chambers, the smoke or volatile products will escape into the side flues, *n n*, of the oven. The rear boiling-chambers are respectively bounded in part by the plates *m m*. Vertical plates *o o* are arranged in the back boiling-chambers, as seen in Fig. 3, and for the purpose of directing the heat around the boilers or preventing it from too quickly escaping into the oven-flues, from which it is conveyed into the chimney.

It may be sometimes convenient to use but one additional boiling-chamber, placed directly in rear of either one of the boiling-chambers *c c*, and aside of the elevated oven. I use one or two of said additional chambers in connection with one or two of said front boiling-chambers, *c c*, as occasion may require.

It is deemed unnecessary to describe the arrangement of the flues which carry the smoke around the oven, as such makes no part of my present improvement.

The floor of each of the boiling-chambers is composed of masonry, and the top of said chamber of cast-iron plate or other proper material.

What I claim as my invention, and desire to secure by Letters Patent, is—

1. The combination of either or both the additional boiling-chambers with the front boiling chamber or chambers, fire-place, and elevated oven of the cooking-range, substantially as hereinbefore described, my improvement enabling me to increase the capacity of the said cooking apparatus, in the manner set forth.

2. In combination with the front and rear boiling-chambers on either side of the fire-place, the additional side flues and dampers, by which the volatile products of combustion may be made to circulate around the lower portion of the front boiler before passing to the additional boiler, substantially as herein described.

3. The so arranging either of the additional boiling-chambers, the front boiling-chamber, and fire-place, substantially as exhibited in Fig. 3, that the heat radiated directly from the fire-place may be caused to impinge against the secondary boiler without being improperly obstructed by the front boiler, the object of such arrangement being to enable one to employ on the additional boiler in the additional chamber the heat radiated directly from the fire for the purpose of effectually raising the liquid contents of the additional boiling-vessel to a boiling temperature, as hereinbefore specified.

In testimony whereof I have hereunto set my signature this 19th day of July, A. D. 1847.

MOSES POND.

Witnesses:
R. H. EDDY,
G. G. HUBBARD.